Dec. 23, 1969    E. J. WERNER    3,484,920

CHIPBREAKER AND TOOLHOLDER

Filed June 21, 1968

INVENTOR
ERIC J. WERNER
BY
Charles H. Rector
ATTORNEY

United States Patent Office 3,484,920
Patented Dec. 23, 1969

3,484,920
CHIPBREAKER AND TOOLHOLDER
Eric J. Werner, 1129 Central Ave.,
Plainfield, N.J. 07062
Filed June 21, 1968, Ser. No. 740,442
Int. Cl. B26d 1/00
U.S. Cl. 29—96                                     6 Claims

ABSTRACT OF THE DISCLOSURE

A tool holder is disclosed having a clamping head and a chipbreaker together with means for retaining the chipbreaker on the head when the clamping elements of the head are loosened to permit the cutting insert to be repositioned or changed.

BACKGROUND

Figure 1:
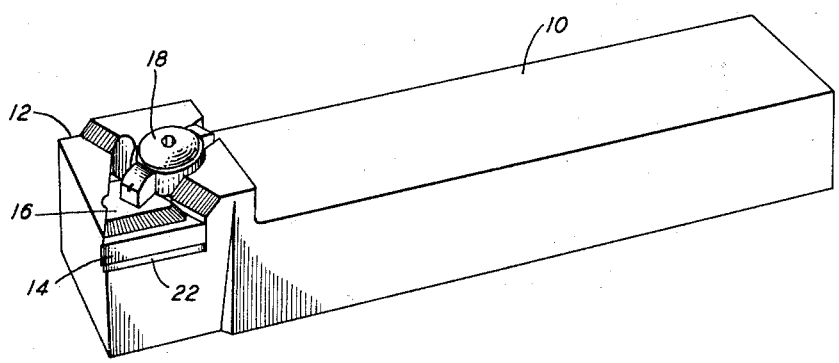

This invention relates to a toolholder for a metal working machine, and in particular to toolholder which rigidly holds and clamps a disposable cutting insert during the metal cutting or forming operations on which the insert is used. This invention further relates to a toolholder having a chipbreaker which is automatically retained on the holder without any care or effort being required of the operator in order to prevent the possible loss of the chipholder when the cutting insert is replaced.

Chipbreakers are required on the toolholders of high speed metal cutting machines such as lathes and the like in order that chips of the metal being cut may be bent and thereby quickly broken into small pieces rather than being allowed to become of sufficient length so as to interfer with the cutting operation or be dangerous to the machine operator. Chipbreakers are relatively small in size and therefore, unless special care is taken, it is easy for them to become loose and fall out of the toolholder when the cutting insert is repositioned or replaced. This in turn requires the operator to either obtain a new chipbreaker or to stop and search on the floor among the accumulation of chips for the lost chipbreaker. Either alternative is undesireable since both chipbreakers and lost production time are expensive.

Toolholders are known that have chipbreakers and means for retaining a chipbreaker whenever the cutting insert is repositioned or replaced. Although the expedients used to retain the chipbreakers in the prior art toolholders are operationally feasible, they have not been widely accepted commercially since (1) their design is involved and thus the cost of the resultant toolholder becomes excessive. (2) Their design requires a specially designed toolholder rather than one which has universal application with respect to different cutting machines and different inserts.

BRIEF SUMMARY OF INVENTION

It is therefore an object of the invention to provide an improved arrangement for retaining a chipbreaker in a toolholder.

It is a further object to provide an improved chipbreaker retaining arrangement that is inexpensive in cost and universal in its application.

In accordance with the invention, a chipbreaker of a conventional size and configuration is provided that has two tabs. A recessed portion of the cooperating toolholder is milled so that two channels are formed in the side walls of the opening that receives the chipbreaker. The tabs on the chipbreaker are received by the channels so that the chipbreaker cannot slide foreward and out of the holder when a cutting insert is replaced.

The advantages of the chipbreaker provided in accordance with the invention are that it is inexpensive, it requires no additional parts on the toolholder, it is universal in its application, and it may therefore be used on most of the toolholders in present day commercial use.

Figure 3:
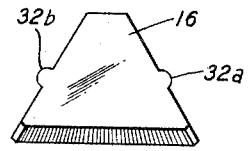
Figure 2:
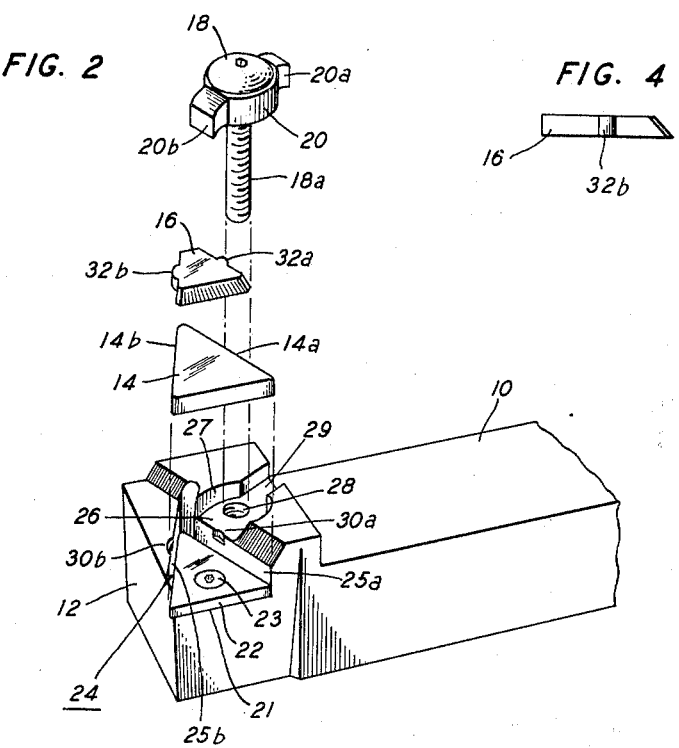
Figure 4:
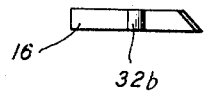

These and other objects and advantages of the invention will become more apparent upon a reading of the following description thereof taken in conjunction with the drawing in which:

FIGURE 1 is a perspective view of a cutting toolholder embodying the invention.
FIGURE 2 is a perspective view in which certain of the toolholder parts are shown in exploded form.
FIGURE 3 is a plan view of the chipbreaker.
FIGURE 4 is a side view of the chipbreaker.

DETAILED DESCRIPTION

With reference to the drawing figures, a cutting tool embodying the present invention is shown as including a shank portion 10 and a clamping head 12. The clamping head may be of any desired shape and it comprises means for clamping a cutter insert 14 with its cutting edge rigidly oriented in a predetermined position. The clamping head 12 further includes a chipbreaker 16 which is positioned on the top surface of cutting insert 14 and which is held firmly against the insert by means of ear 20a of a clamp 20. The clamping head further includes an anvil 22 which by means of screw 23 is held against plane surface 21 on the lower portion of an opening or recess 24 formed in the had 12. The recess further includes rear sidewalls 25a and 25b each of which forms a substantially vertical plane which intersect with each other in the rear more portion of the recess. The angle formed by the plane sides 25a and 25b with respect to each other corresponds to the angle defined by the sides 14a and 14b of the cutting insert. The cutting insert is configured to match the configuration of recess 24 and the insert is held within the recess as shown in FIGURE 1.

The details of the geometry of the recess 24 is determined solely by the shape of the insert 14. Therefore, the recess 24 may differ from that shown in the drawing in order to accommodate inserts of other configurations, i.e. rectangular, etc.

The clamping head 12 further includes another recess having a lower plane surface 26, semicircular walls 27, a tapped hole 28, and a slot portion 29 which is adapted to receive a rear wing portion 20b of the clamp 20. The threaded portion 18a of screw 18 is adapted to screw into the tapped hole 28. The upper portion of screw 18 is rotatably positioned within a hole in the center of clamp 20.

As shown in the drawing, the insert 14 is placed in the recess 24 on top of anvil 22, the chipbreaker 16 is then positioned on top of the insert, the screw 18 is passed through an opening in the center of clamp 20, and the screw is threaded into hole 28 until the clamp ear 20a urges the chipbreaker firmly against the insert 14. The rear ear 20b of clamp 20 is received by the portion 29 of the recess 26. Prior to the tool being used, the screw 18 is tightened to hold the chipbreaker and in turn, the cutting insert with the required pressure so that it will not shift its position during a cutting operation.

Further in accordance with the invention, a recess 30b is formed in wall 25b and a recess 30a is formed in wall 25a. The sides of chipbreaker 16 are formed with tabs 32b and 32a. The sides and tabs of the chipbreaker are configured to cooperate with the side walls and its recesses 30b and 30a so that the chipbreaker may be inserted in the recessed opening 24 as shown in FIG. 1. When so inserted, the tabs of the chipbreaker are positioned in recesses 30a and 30b. As long as the chipbreaker tabs remain within the recesses 30a and 30b, the chipbreaker is prevented from moving forward and out of the head 12. This prevents the chipbreaker from falling out of the head 12 when the screw 18 is loosened to change cutting insert 14. At this time, the lower seat of recesses 30a and 30b prevent the chipbreaker from falling against the anvil 22 when the insert 14 is removed. This maintains a fixed minimum distance between the anvil and the chipbreaker and facilitates the insertion of a new cutting insert 14.

Although the chipbreaker is retained by its tabs 32a and 32b when screw 18 is only slightly loosened, the chipbreaker may itself be removed if screw 18 is loosened sufficiently so that the tabs 32a and 32b may be lifted above the upper portion of recessed opening 30a and 30b. When so lifted the chipbreaker may then be moved forward and out of head 12.

It may be seen from the foregoing that the provision of tabs on the chipbreaker and the provision of cooperating recesses in the side walls of the opening into which the chipbreaker fits provides a new and novel arrangement whereby the chipbreaker is firmly held within the clamping head when the clamping arrangement of the head is loosened to permit the cutting insert to be changed.

It is to be understood that the above described arrangements are but illustrative of the application of the principles of the invention. Numerous other arrangements may be devised by those skilled in the art without departing from the spirit and scope of the invention.

I claim:

1. A toolholder having a shank and a clamping head at one end thereof, a recess in said head having an open top and side walls, a lower flat surface on the bottom of said recess, a cutting insert positioned in said recess on top of said lower flat surface with the cutting edges of said insert projecting beyond said head, a left and a right side on said insert each of which is parallel to and adjacent one of said side walls, a chipbreaker having a lower flat surface and positioned in said recess on top of said insert, a substantially vertical channel in the surface of each of said walls, a tab on each side of said chipbreaker with said tabs being configured so that each is positioned in one of said channels when said chipbreaker is on top of said insert and in said recess, said tabs and said channels comprising means for preventing said chipbreaker from moving forward out of said recess, and means for rigidly holding said insert in said head.

2. The invention of claim 1 in which said means for holding comprises, a substantially vertically oriented screw, a hole in an upper surface of said head with said hole being threaded to receive said screw, a clamp having a hole for rotatably receiving the threaded portion of said screw prior to its insertion into the threaded hole in said head, an ear on said clamp, said ear being effective to apply a downward force on said chipbreaker and in turn on said insert when said screw is rotated to travel further into said threaded hole.

3. The invention of claim 1 in combination with means for maintaining a minimum distance between said chipbreaker and said lower surface when said insert is removed from said holder.

4. A toolholder comprising a clamping head at one end thereof, an upper clamp, a lower clamping means, a screw extending through said upper clamp and threadably engaging a hole in said head, a cutter insert being positioned on top of said lower clamping means, said screw being effective to hold said insert against said lower clamping means with its cutting edge projecting beyond said head, a chipbreaker positioned between said insert and said upper clamp, a tab on each side of said chipbreaker, and means on said head for receiving said tabs to define the vertical travel of said chipbreaker while preventing the chipbreaker from sliding out of said head when said screw is loosened to reorient said insert.

5. A toolholder having a clamping head which comprises, a recessed opening having side walls and a bottom plane surface, a cutting insert positioned atop said bottom surface, a chipbreaker positioned atop said insert, means for exerting downward pressure on said chipbreaker to hold said insert rigidly fixed durnig a cutting operation, index means on each side of said chipbreaker, index receiving means on each of said walls, said index means and said index receiving means comprising means for permitting said chipbreaker to move vertically but for preventing said chipbreaker from moving forward and out of said opening when said pressure exerting means is released to permit said insert to be reoriented or replaced.

6. The invention of claim 5 wherein said index means comprises a tab on each side of said chipbreaker and wherein said index receiving means comprises a vertically oriented channel in the surface of each of said walls with said channels being configured to receive said tabs when said chipbreaker is positioned on top of said insert.

References Cited

UNITED STATES PATENTS

| | | | |
|---|---|---|---|
| 2,911,707 | 11/1959 | Almen | 29—96 |
| 2,967,345 | 1/1969 | Novkov | 29—96 |
| 3,113,372 | 12/1963 | Hargreaves | 29—96 |
| 3,171,188 | 3/1965 | Stiev | 29—96 |

HARRISON L. HINSON, Primary Examiner